United States Patent
Monros

[11] Patent Number: 5,900,267
[45] Date of Patent: May 4, 1999

[54] **PROCESS TO OBTAIN A FOOD COMPOSITION BASED ON CHUFAS (*CYPERUS ESCULENTUS*) AND BANANAS, AND COMPOSITIONS OBTAINED**

[76] Inventor: Salvador Coret Monros, c/Dolores Marqués no. 47, 46020 Valencia, Spain

[21] Appl. No.: 08/911,196

[22] Filed: Aug. 14, 1997

[30] Foreign Application Priority Data

Aug. 22, 1996 [ES] Spain .................................. 9601835

[51] Int. Cl.⁶ .............................. A23B 7/10; A23L 2/02; A23L 2/04
[52] U.S. Cl. .................... 426/615; 426/481; 426/518; 426/519; 426/521; 426/541; 426/578; 426/599; 426/629; 426/632; 426/633
[58] Field of Search ..................... 426/615, 629, 426/632, 633, 578, 518, 519, 521, 541, 481, 599

[56] References Cited

U.S. PATENT DOCUMENTS 3,259,508   7/1966   Aguirre et al. .

FOREIGN PATENT DOCUMENTS

| | | |
|---|---|---|
| 8402146 | 12/1982 | Spain . |
| 8704717 | 5/1987 | Spain . |
| 2017560 | 2/1991 | Spain . |
| 2026306 | 4/1992 | Spain . |
| 2031431 | 12/1992 | Spain . |
| 470508 | 8/1937 | United Kingdom . |

OTHER PUBLICATIONS

Regarding the extraction of banana juice in connection with the production of banana beer.P.Dupagne, Feb. 7, 1984, pp. 821–822 Fruits–vol. 29, No. 1.

Madrid et al. 1995. "Preparation of orgeat and slush", Technologiá de Elaboracion de los Heladof, pp. 311–315.

*Primary Examiner*—Helen Pratt
*Attorney, Agent, or Firm*—Rodman & Rodman

[57] ABSTRACT

Process to obtain a food composition based on chufas and bananas. The chufas are crushed to obtain liquid chufa orgeat at a low temperature, from which the starch is separated and sodium caseinate, sugar and stabilizers added, as well as an emulsifier previously melted in hot water. On the other hand, peeled bananas are crushed with ascorbic and citric acids, filtering the resulting liquid. The chufa orgeat is mixed with the banana liquid with sugar and flavor for its packing under aseptic conditions.

8 Claims, No Drawings

PROCESS TO OBTAIN A FOOD COMPOSITION BASED ON CHUFAS (*CYPERUS ESCULENTUS*) AND BANANAS, AND COMPOSITIONS OBTAINED

This invention is related to a process to obtain a food composition based on chufas (*Cyperus esculentus*) and bananas, having a pleasant flavour and extended life.

The food product obtained according to the process of this invention is highly nutritive and refreshing due to the composition of its basic fruits, namely, chufas and bananas included in its preparation, as well as its storage stability.

The process for this invention has an application in the industry for the preparation of food compositions, popularly known as chufa orgeats (hereinafter referred to orgeat).

The invention, by means of the process to be described later, represents and advance in the orgeat industry, since by means of using it, and with the inclusion of fruits like chufas and bananas, a highly nutritive, refreshing and conservation stable product is obtained.

As is already known, chufas consist of lipids, proteins, minerals and carbohydrates.

Approximately 85% of the lipids are unsaturated fatty acids, the most important oleic acid (mono-unsaturated) (75%) and linoleic acid (poly-unsaturated) (10%). Hence, chufas do not contain cholesterol.

Linoleic acid is an essential fatty acid and its recommended daily ingestion is from 15 to 20 grams per day and its intervention is remarked in the synthesis of prostaglandins (modulators of all cellular activities, controlling the contraction of the smooth muscles, glandular secretions, reabsorption of water and electrolytes, neuro-transmission, aggregation of platelets, induction of fever and inflammatory responses).

The proteins constitute about 10% of the dry material. They share with fibre, the third place in ranking of the components of the tubercle. The most abundant aminoacid is arginine which contributes a high content of phenylalanine+tyrosine forming part of the composition of other aminoacids like leucine, isoleucine, lysine, methionine+cystine, threonine, valine and thryptophane. In total contributes 41 g/100 g protein in essential aminoacids.

The contribution of minerals from chufas is important. Potassium is the macro-element found in greatest proportion (543.70 mg/100 chufa-soluble substance). Potassium plays an important role in most vital functions like cellular metabolism, proteic synthesis, glucide synthesis and neuro-muscular excitability. Its main functions include the regulation of cellular water content, the activation role of enzymatic systems and the increase of neuro-muscular excitability.

The other important minerals include:

Phosphorus (285 mg/100 g chufa soluble substance) and calcium (103 mg/100 g chufa soluble substance). Calcium is fundamental in growth to obtain a good calcification of the bones, as well as for adults to prevent decalcification.

Magnesium (95.50 mg/100 g chufa soluble substance). Magnesium is found inside the cells, where it satisfies functions as an activator of several enzymes and also intervenes in the transmission of the nervous pulses of the motor plate. According to recent data, its importance in anti-stress should be mentioned.

Zinc (4.32 mg/100 g chufa soluble substance). This is a component of important enzymes like alkaline phosphatase and carbonic anhydrase. From 10 to 15 mg daily are considered necessary.

Iron (4.21 mg/100 g chufa soluble substance). Iron is necessary for the formation of hemoglobin. Each molecule of the latter contains one iron atom. The organism responds to iron deficiency with anemia. Ferropenic anemia is not only the first among all the different causes of anemia, but also the main nutritional deficit in the Western world. From 10 to 15 mg daily are considered necessary. It is important to remember that milk contains a small amount of iron.

With respect to carbohydrates, starch is the most abundant in chufas. It represents between 30% and 40% of the tubercle weight. Free sugars follow in importance to starch. Saccharose constitutes almost all of them, being about 12.5% of the tubercle weight. Reducing sugars (Alpha-glucose, beta-glucose, fructose and galactose). Its essential function is energetic.

Most of the fiber contained by chufas is cellulose (8.5%). Vegetable fiber is the non-digestible and non-absorbable part of many foods of a vegetable origin. It consists of substances of different chemical composition, although most of them are polysaccharides. It is also called dietetic fiber and nutrient fiber. In spite of the fact that their component could be considered of little use, since they are eliminated with the faeces, in recent years their properties have been studied with great interest after it was published that very probably, there is a relation between the low ingestion of fibre and certain diseases.

For all that indicated above, we may conclude that orgeat is a nutritive and refreshing product, having a high content of unsaturated fatty acids and especially linoleic acid making it a foodstuff, which, besides not contributing cholesterol, is suitable for diets of both adults and children. Its high energetic value should also be remarked reinforcing its use for children and sportsmen/women, and its high mineral content, especially potassium, which as has been mentioned above plays an important role in the nervous system. Likewise, its high fiber content makes it recommendable as an intestine regulator and prevents diseases like colon cancer. Its astringent capacity in cases of intestinal upsets is also known.

Due to its composition, orgeat may be a good substitute for milk due to the fact that it contains an adequate proportions of fats, but without contributing cholesterol, a high content of carbohydrates, minerals, including iron (milk lacks this mineral) and contains other essential aminoacids, although they may be completed with other proteins.

Regarding bananas, it is also known that their composition includes proteins, lipids, carbohydrates, fiber, minerals and vitamins, their low fat content being important. With this background, the object of this invention consists in providing a process for the preparation of a food composition based on chufas and bananas, where the characteristics of both fruits are taken advantage of, to enhance their benefits.

Specifically and in accordance with a first aspect, the invention provides a process to obtain a food composition based on chufas and bananas consisting of the following stages:

crush the chufas to obtain orgeat at a low temperature, preferably at about 6° C.; separate the starch by centrifuging and add, sodium caseinate, sugar and stabilizers;

add an emulsifier, previously prepared in hot water, to the resulting orgeat;

crush peeled bananas, with ascorbic and citric acids, and filter the resulting liquid;

mix the chufa with the banana liquid with sugar and flavors; and sterilize the resulting composition under UHT conditions, for its further packing under aseptic conditions.

Below, examples of the practical execution of the invention are shown, whose example should only be considered as illustrative and in no way limiting the scope of the invention.

EXAMPLE

For the preparation of 2000 liters of product, on the basis of chufas and bananas, orgeat is obtained by crushing the chufas in drinking water at a proportion of 1 kg chufas for 6 liters of orgeat, to obtain 1000 liters of orgeat. Then, the starch is separated by centrifuging in a decanter and 123 kg of sugar are added, 2 kg sodium caseinate and 280 grams stabilizer based on disodium phosphate-sodium citrate.

In a separate container, 2.8 kg emulsifiers, based on esters of poly-unsaturated fatty acids are melted with water at 70° C. and the resulting mixture is added to the previously prepared orgeat.

Likewise, in another container, 136 kg peeled bananas are crushed and 285 g ascorbic acid and 100 g citric acid are added, after which, the liquid is filtered in a static filter.

The resulting banana liquid is then mixed with the orgeat and sugar and banana flavor added, after which, the mixture is submitted to the UHT process, being heated at 70° C. and homogenization at 200 bars, sterilization at 140° C. for 4 seconds and then cooled, followed aseptic packing of the product.

I claim:

1. A process for preparing a food composition based on chufas (*cyperus esculentus*) and bananas, comprising:

(a) crushing the chufas to produce a starch-containing chufa orgeat;
   (b) separating the starch from the chufa orgeat to produce a starch-free chufa orgeat, and adding sodium caseinate, sugar and stabilizers;
   (c) adding an emulsifier to the starch-free chufa orgeat to form an emulsified chufa orgeat;
   (d) crushing peeled bananas with ascorbic and citric acid and separating the resulting banana liquid;
   (e) mixing the emulsified chufa orgeat with the banana liquid to produce the food composition.

2. The process of claim 1, wherein the chufas are crushed at a low temperature.

3. The process of claim 2, wherein the temperature is about 6° C.

4. The process of claim 1, wherein the starch is separated from the chufa orgeat by centrifugation.

5. The process of claim 1, wherein the food composition is sterilized under ultra high temperature conditions.

6. The process of claim 5, wherein the food composition is packaged under aseptic conditions.

7. A food composition formed by the process of claim 1.

8. A food composition based on chufas (*cyperus esculantus*) and bananas, comprising an emulsified stabilized starch-free chufa orgeat mixed with the liquid separated from crushed peeled bananas which have been treated with ascorbic acid and citric acid.

* * * * *